United States Patent
Kanatzidis et al.

(10) Patent No.: US 12,359,279 B2
(45) Date of Patent: Jul. 15, 2025

(54) CONJUGATED POLYMERS FOR THE SELECTIVE ELECTROLESS RECOVERY OF GOLD AND SILVER FROM SOLUTIONS

(71) Applicant: Northwestern University, Evanston, IL (US)

(72) Inventors: Mercouri G. Kanatzidis, Wilmette, IL (US); Shulan Ma, Beijing (CN)

(73) Assignee: Northwestern University, Evanston, IL (US)

( * ) Notice: Subject to any disclaimer, the term of this patent is extended or adjusted under 35 U.S.C. 154(b) by 887 days.

(21) Appl. No.: 17/439,309

(22) PCT Filed: Mar. 16, 2020

(86) PCT No.: PCT/US2020/022950
§ 371 (c)(1),
(2) Date: Sep. 14, 2021

(87) PCT Pub. No.: WO2020/190856
PCT Pub. Date: Sep. 24, 2020

(65) Prior Publication Data
US 2022/0154307 A1    May 19, 2022

Related U.S. Application Data

(60) Provisional application No. 62/820,978, filed on Mar. 20, 2019.

(51) Int. Cl.
C22B 11/00     (2006.01)
C22B 3/42      (2006.01)

(52) U.S. Cl.
CPC .............. *C22B 11/042* (2013.01); *C22B 3/42* (2013.01)

(58) Field of Classification Search
CPC ........... C22B 11/042; C22B 3/42; Y02P 10/20
See application file for complete search history.

(56) References Cited

U.S. PATENT DOCUMENTS

| | | | |
|---|---|---|---|
| 5,108,573 A | 4/1992 | Rubinstein et al. | |
| 5,233,000 A | 8/1993 | Yodice | |
| 5,411,573 A | 5/1995 | Kang et al. | |
| 5,514,253 A | 5/1996 | Davis et al. | |
| 8,974,578 B2 | 3/2015 | Kanatzidis et al. | |

(Continued)

FOREIGN PATENT DOCUMENTS

WO    WO 2019/246172 A1    12/2019

OTHER PUBLICATIONS

Ting et al. "Recovery of gold by electroless precipitation from acid solutions using polyaniline". Journal of Chemical Technology & Biotechnology, 1994, vol. 59, pp. 31-36. (Year: 1994).*

(Continued)

*Primary Examiner* — Sally A Merkling
*Assistant Examiner* — Danny N Kang
(74) *Attorney, Agent, or Firm* — Bell & Manning, LLC

(57) ABSTRACT

Conjugated organic polymers doped with anions and methods for the use of the anion-doped conjugated organic polymers in the selective electroless extraction and recovery of gold or silver from samples containing gold anions or silver anions are provided. The anion-doped polymers have a conjugated, positively charged backbone chain that is charge-balanced with associated dopant anions.

22 Claims, 12 Drawing Sheets

(56) References Cited

U.S. PATENT DOCUMENTS

| | | | |
|---|---|---|---|
| 9,468,923 | B2 | 10/2016 | Kanatzidis et al. |
| 9,536,633 | B2 | 1/2017 | Higashimura et al. |
| 2004/0146786 | A1 | 7/2004 | Sato et al. |
| 2005/0121390 | A1* | 6/2005 | Wallace .................. C22B 11/04 210/688 |
| 2009/0277303 | A1 | 11/2009 | Wallace et al. |
| 2014/0097141 | A1 | 4/2014 | Kanatzidis et al. |
| 2015/0336050 | A1 | 11/2015 | Kanatzidis et al. |
| 2020/0392284 | A1 | 12/2020 | Kanatzidis et al. |
| 2024/0400754 | A1 | 12/2024 | Kanatzidis |

OTHER PUBLICATIONS

Kang, E. T., et al. "Electroless recovery of precious metals from acid solutions by N-containing electroactive polymers," *Synthetic Metals* 69. 1-3 (1995): 477-478.

Kang, E. T., Y. P. Ting, and K. L. Tan. "Electroless reduction and precipitation of gold from acid solution by polypyrrole," *Journal of applied polymer science* 53.11 (1994): 1539-1545.

Zhang, X., and Renbi Bai. "Surface electric properties of polypyrrole in aqueous solutions," *Langmuir* 19.26 (2003): 10703-10709.

Price, William E., Stephen F. Ralph, and Gordon G. Wallace. "Current Chemistry: Separation and Recovery of Gold and Other Metals Using Conducting Polymers," *Australian journal of chemistry* 54.10 (2001): 615-619.

Jie Ding, "Separation and recovery of metal ions using conducting polymers," Doctor of Philosophy thesis, Department of Chemistry, University of Wollongong, 2001. http://ro.uow.edu.au/theses/1172; pp. 1-268.

M.M. Castillo-Ortega et al., "Adsorption and desorption of a gold-iodide complex onto cellulose acetate membrane coated with polyaniline or polypyrrole: a comparative study," *J. Mater. Sci* (2011, vol. 46; pp. 7466-7474. DOI 10.1007/s10853-011-5714-2.

Ding, Jie, et al. "Recovery of gold cyanide using inherently conducting polymers." *Polymer international* 52.1 (2003): 51-55.

Li, Sheng, Yubing Qiu, and Xingpeng Guo. "Influence of doping anions on the ion exchange behavior of polypyrrole." *Journal of Applied Polymer Science* 114.4 (2009): 2307-2314.

Peter R. Zalupski et al., "The adsorption of gold, palladium and platinum from acidic chloride solutions on mesoporous carbons," Aqueous Separations and Radiochemistry Department, Idaho National Laboratory, Idaho Falls, ID 83415; pp. 1-21.

Falk Muench et al., "Template-Free Electroless Plating of Gold Nanowires: Direct Surface Functionalization with Shape-Selective Nanostructures for Electrochemical Applications," *Applied Materials & Interfaces* 2017, vol. 9; pp. 31142-31152.

Ting, Y. P., et al., "Recovery of gold by electroless precipitation from acid solutions using polyaniline," *Journal of Chemical Technology & Biotechnology: International Research in Process, Environmental and Clean Technology* 59.1 (1994): 31-36.

Pang, Siu-Kwong, and Kam-Chuen Yung, "Prerequisites for achieving gold adsorption by multiwalled carbon nanotubes in gold recovery," *Chemical Engineering Science* 107 (2014): 58-65.

Ding, Jie, et al., "Electroless recovery of gold chloride using inherently conducting polymers," *Polymer international* 53.6 (2004): 681-687.

Yue, Chunlin, et al, "Environmentally benign, rapid, and selective extraction of gold from ores and waste electronic materials," *Angewandte Chemie International Edition* 56.32 (2017): 9331-9335.

The International Search Report and the Written Opinion issued on Jun. 16, 2020 for International application No. PCT/US2020/022950; pp. 1-8.

Habibun Nabi Muhammad Ekramul Mahmud et al., "The removal of heavy metal ions from wastewater/aqueous solution using polypyrrole-based adsorbents: a review," *RSC Adv.*, 2016, vol. 6; pp. 14778-14791.

Hossein Elsazadeh, "Removal of Arsenic in Water using Polypyrrole and its Composites," *World Applied Sciences Journal*, 2008, vol. 3, No. 1; pp. 10-13.

Javadian et al., "Application of novel Polypyrrole/thiol-functionalized zeolite Beta/MCM-41 type mesoporous silica nanocomposite for adsorption of Hg2+ from aqueous solution and industrial wastewater: Kinetic, isotherm and thermodynamic studies," *Applied Surface Science*, (2014), vol. 289; pp. 487-494. https://doi.org/10.1016/j.apsusc.2013.11.020

George Tsekouras et al., "Gold Recovery Using Inherently Conduction Polymer Coated Textiles," *Fibers and Polymers* 2004, vol. 5, No. 1: pp. 1-5.

Ansari, R., and N. Khoshbakht Fahim. "Application of polypyrrole coated on wood sawdust for removal of Cr (VI) ion from aqueous solutions," Reactive and Functional Polymers 67.4 (2007): 367-374.

Saoudi, Bachir, et al. "DNA adsorption onto conducting polypyrrole." Synthetic metals 87.2 (1997): 97-103.

Zhang, X., Renbi Bai, and Y. W. Tong. "Selective adsorption behaviors of proteins on polypyrrole-based adsorbents," *Separation and purification technology* 52.1 (2006): 161-169.

Bhaumik, Madhumita, et al. "Enhanced removal of Cr (VI) from aqueous solution using polypyrrole/Fe3O4 magnetic nanocomposite." Journal of Hazardous Materials 190.1-3 (2011): 381-390.

Ma, Shulan, et al. "Highly selective and efficient heavy metal capture with polysulfide intercalated layered double hydroxides," *Journal of Materials Chemistry A* 2.26 (2014): 10280-10289.

Ma, Lijiao, et al. "Highly selective and efficient removal of heavy metals by layered double hydroxide intercalated with the MoS42- ion," *Journal of the American Chemical Society* 138.8 (2016): 2858-2866.

Hassanzadeh Fard, Zohreh, et al. "Direct extraction of Ag+ and Hg2+ from cyanide complexes and mode of binding by the layered K2MgSn2S6 (KMS-2)," *Chemistry of Materials* 27.6 (2015): 1925-1928.

The International Search Report & Written Opinion issued for International Patent Application No. PCT/US2018/065614 on Feb. 14, 2019, pp. 1-7.

Hongxia Wang et al., "Polypyrrole-coated electrospun nanofibre membranes for recovery of Au(III) from aqueous solution," Deakin Research Online, Journal of membrane science, vol. 303, No. 1-2, pp. 119-125.

Akif Kaynak et al., "Synthesis and Characterization of Soluble Conducting Polymers," RJTA vol. 14, No. 2, 2010:45-52.

S. Archana et al., "Synthesis and Characterization of Poly (p-phenylenediamine) in the Presence of Sodium Dodecyl Sulfate," Research Journal of Chemical Sciences vol. 4(2), 60-67, Feb. 2014: 60-67.

Gordana Ciric-Marjanovic et al., "The Oxidative Polymerization of p-Phenylenediamine with Silver Nitrate: Toward Highly Conducting Micro/Nanostructured Silver/Conjugated Polymer Composites," Journal of Polymer Science Part A: Polymer Chemistry, DOI.10.1002/POLA; 3387-3403.

E. T. Kang et al., "Spontaneous and sustained gold reduction by polyaniline in acid solution," Polymer, 1993, vol. 34, No. 23: 4994-4996.

Chepuri R. K. Rao et al., "Synthesis and properties of polypyrrole obtained from a new Fe(III) complex as oxidizing agent," Indian Journal of Chemistry, vol. 52A, Jun. 2013: 744-748.

The International Preliminary Report on Patentability issued on Jun. 25, 202 for international application No. PCT/US2018/065614; pp. 1-6.

* cited by examiner

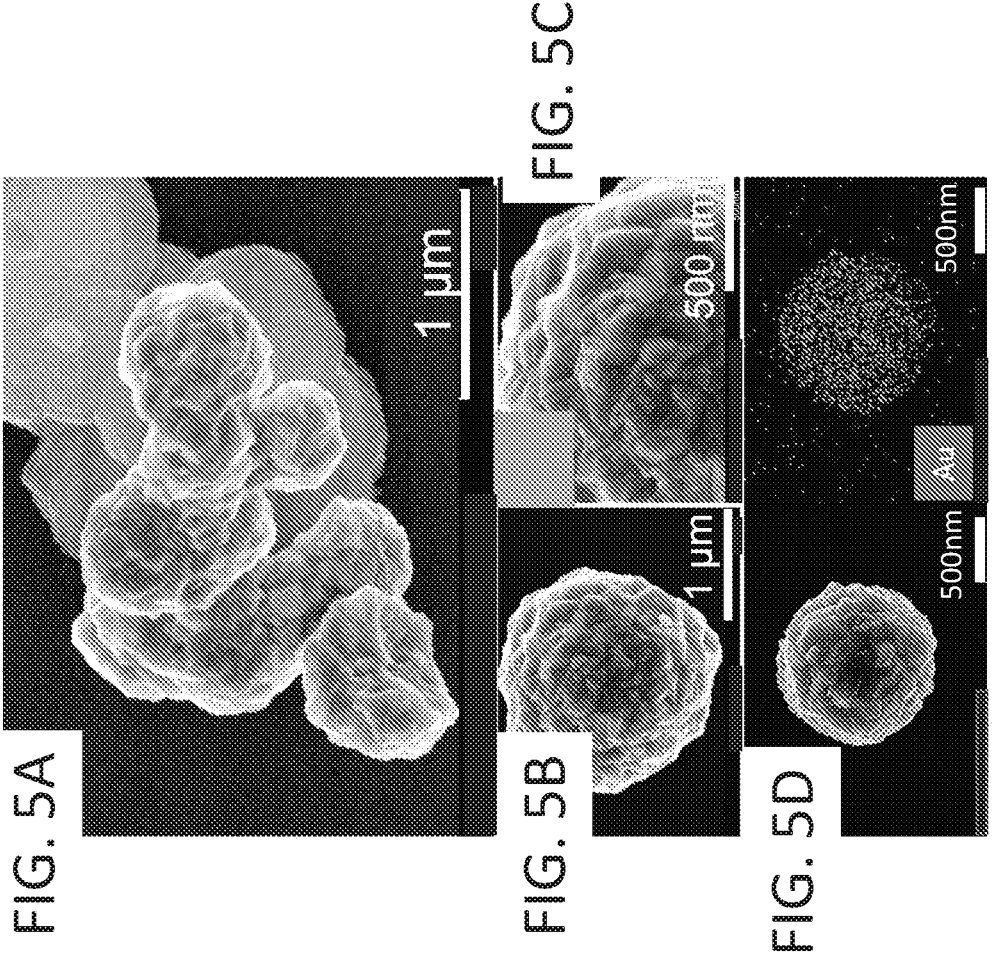

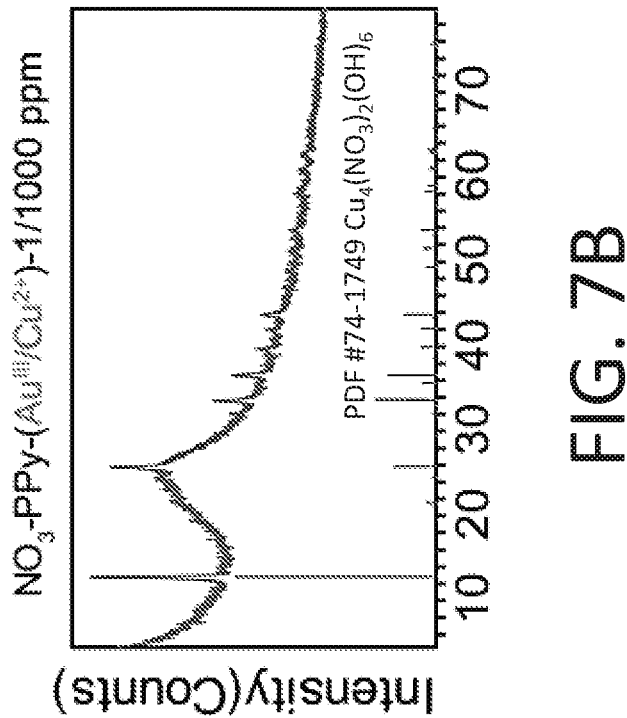
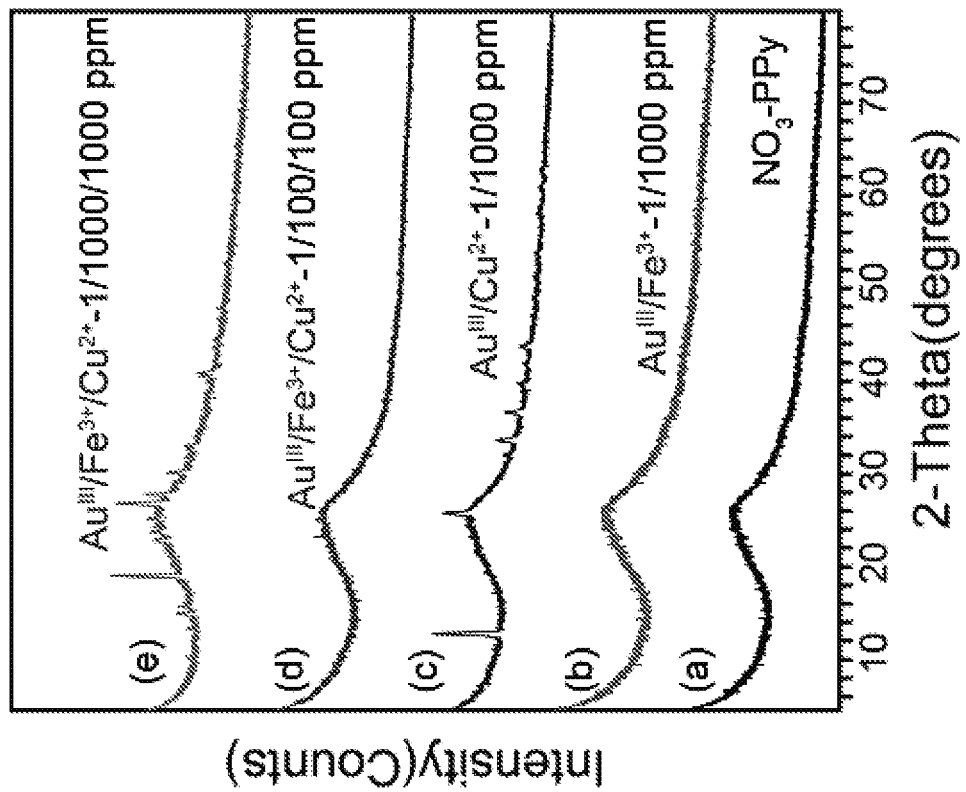
FIG. 7B
FIG. 7A

CONJUGATED POLYMERS FOR THE SELECTIVE ELECTROLESS RECOVERY OF GOLD AND SILVER FROM SOLUTIONS

CROSS-REFERENCE TO RELATED APPLICATIONS

This application is a National Stage of International Application No. PCT/US2020/022950, filed Mar. 16, 2020, which claims the priority benefit of U.S. Patent Application No. 62/820,978, filed Mar. 20, 2019, the entire contents of both of which are incorporated herein by reference.

BACKGROUND

As a precious metal, gold occupies a central place in society relying on its economic value, its extensive use in technological applications, and its aesthetic appeal in jewelry and ornaments. There is particular interest in developing highly efficient and environmentally-friendly methods for gold recovery from gold sources, such as mine tailings, industrial wastes, gold-bearing ores, electronic scraps, and leaching residues. The extraction of low-grade gold from ores or waste electrical and electronic equipment (WEEE) usually follows three steps: 1) oxidative leaching of gold from solid ore or WEEE, 2) separation and concentration of gold ions from the leaching solution, and 3) reduction of extracted gold ions to neutral gold materials. Gold is very stable in air and most aqueous solutions and only dissolves in oxidizing solutions containing certain complexing ligands, of which only a few (such as cyanide, chloride, and thiourea ions) can form complexes stable enough for gold extraction. For the first step, the classical gold leaching is performed using cyanide as an extraction agent, due to its simplicity and economy. However, this strategy suffers from several drawbacks, including its lethal toxicity, risk of explosion, high energy consumption and processing complexity, owing to the use of cyanide. Thus, it is necessary and important to develop new methods of gold separation or recovery from cyanide-free containing systems.

Gold halogenation and extraction from acid solution using cyanide-free reagents has been explored. Aqueous solutions of chlorine have been used extensively for water and waste treatment due to their strong oxidizing capabilities. Several other techniques also have been utilized for gold recovery by less energy-intensive processes, such as activated carbon, electroless plating, and biomass and biomaterials.

The use of conducting polymers, which combine the functionality of traditional organic polymers with the electrical conductivity of metals, has also been investigated. It has been reported that conducting polymers, such as polypyrrole (PPy) and polyaniline (PANI), have the ability to carry out electroless reduction of gold ions in solution to their elemental form ($Au^0$). (Price, W. E. et al., *Australian Journal of Chemistry* 2001, 54, 615; Wallace, 2009; Kang, E. T. et al., *Polymer* 1993, 34, 4994; Ting, Y. P., et al., *Journal of Chemical Technology and Biotechnology* 1994, 59, 31; Kang, E. T. et al., *Synthetic Metals* 1995, 69, 477.) They have also shown selectivity for $[AuCl_4]^-$ in acidic solution. (Wang, H. X. et al., *Journal of Membrane Science* 2007, 303, 119.)

SUMMARY

Methods for the use of conjugated organic polymers in gold and silver capture and recovery applications are provided.

The methods use anion-doped conjugated polymers to remove gold ions, silver ions, or both from a sample containing such ions. The anion-doped polymers include a conjugated, positively charged backbone of conjugated rings; and charge-balancing anions associated with the conjugated, positively charged backbone, wherein the charge-balancing anions comprise nitrate anions, bromide anions, sulfate anions, acetate anions, or a combination of two or more thereof.

The methods include the steps of: exposing the anion-doped conjugated polymer to the sample, wherein gold ions, silver ions, or both gold ions and silver ions are adsorbed by the anion-doped conjugated polymer and undergo electroless reduction to elemental gold, elemental silver, or both elemental gold and elemental silver; and removing the anion-doped conjugated polymer and the elemental gold, elemental silver, or both elemental gold and elemental silver from the sample.

BRIEF DESCRIPTION OF THE DRAWINGS

Illustrative embodiments of the invention will hereafter be described with reference to the accompanying drawings, wherein like numerals denote like elements.

(FIG. 3A) Concentration change following contact time, (FIG. 3B) Removal % as a function of contact time, (FIG. 3C) Sorption capacity ($q_t$) with contact time, (FIG. 3D) Pseudo-second-order kinetic plots for the sorption.

FIGS. 5A-5D show SEM images of solid samples after $PPy(NO_3)_x$ adsorbed 1200 ppm Au(III) and elemental distribution mappings for Au in the selected area.

FIG. 7A, traces (a)-(e), shows XRD patterns of (trace (a)) $PPy(NO_3)_x$ and solid samples after $PPy(NO_3)_x$ adsorbed mixtures of (trace (b)) 1/1000 ppm of $Au(III)/Fe^{3+}$, (trace (c)) 1/1000 ppm of $Au(III)/Cu^{2+}$, (trace (d)) 1/100/100 ppm of $Au(III)/Fe^{3+}/Cu^{2+}$ and (trace (e)) 1/1000/1000 ppm of $Au(III)/Fe^{3+}/Cu^{2+}$, respectively. FIG. 7B shows a standard pattern of $(Cu_4(NO_3)_2(OH)_6)$.

DETAILED DESCRIPTION

Conjugated organic polymers doped with various anions and methods for their use in gold and silver capture applications are provided. The gold and silver capture can be carried out as an electroless deposition, in which gold and/or silver ions in a solution undergo deposition and reduction without that application of an external electrical potential.

The polymers have a conjugated, positively charged backbone of conjugated rings that is charge-balanced (also referred to as "doped") with associated (NO$_3^-$) anions. The conjugated polymers include electrically conducting and semiconducting polymers (collectively referred to as conducting polymer). Polypyrroles, including poly(alkylpyrroles), are examples of conjugated polymers that can be used. The poly(alkylpyrroles) have alkyl chains pendant from the pyrrole rings of the polymer backbone. These chains have the general structure C$_n$H$_{2n+1}$. In various embodiments, n has a value in the range from two to 22, including in the range from four to 12. However, longer alkyl chains can be present. Other suitable conjugated polymers include, polyanilines, polythiophenes, including polybisthiophene and poly 3-methylthiophene, and polyaryldiamines. Illustrative examples of polyaryldiamines are polyphenylenediamines, including poly(orthophenylenediamine), poly(metaphenylenediamine), and poly(paraphenylenediamine). Like the polypyrroles, these other polymers can have alkyl groups pendant from their backbone rings.

Figure 11:
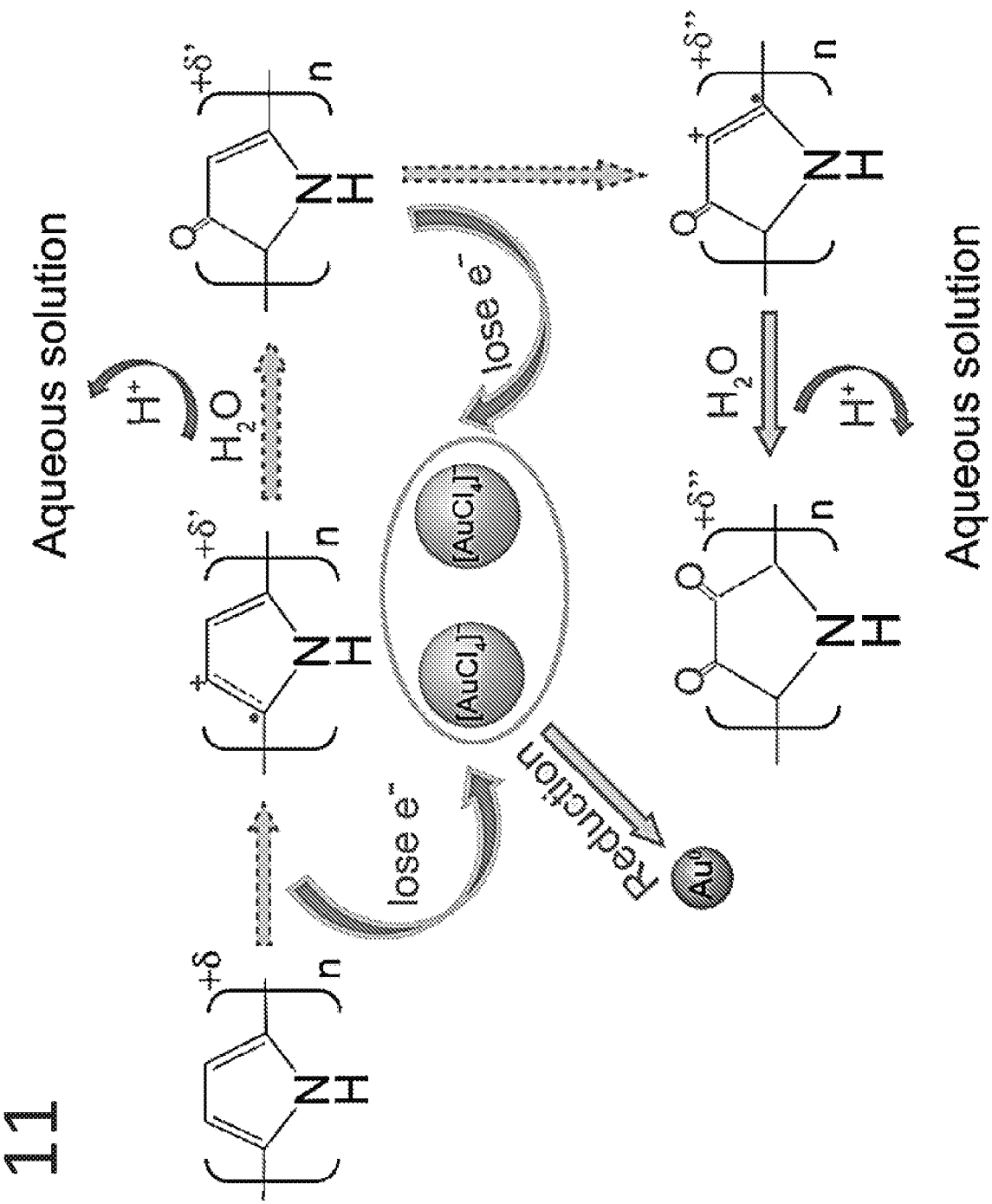
FIG. 11 shows the process of reducing Au(III) to Au$^0$ by PPy(NO$_3$)$_x$.

The charge-balancing dopant anions associated with the conjugated conducting polymers include nitrate (NO$_3^-$) anions and other inorganic anions, such as bromide anions and sulfate anions, as well as acetate anions. By way of illustration, NO$_3^-$-doped polypyrrole, which is referred to herein as NO$_3$-PPy, has a conjugated, positively charged backbone of pyrrole units that is charge-balanced with associated NO$_3^-$ anions. The backbone structure of the NO$_3$-PPy is shown in FIG. 11, where δ is the doping density and n is the average number of pyrrole monomers in the polypyrrole that contain one unit of positive charge. The doping density for the NO$_3^-$ doped polypyrroles is typically in the range from 0.25-0.35.

The anion-doped conjugated polymers can be made by the oxidative polymerization of the monomers that form the polymers using an anion-containing oxidant, such as a metal nitrate, a metal bromide, a metal sulfate, or a metal acetate. By way of illustration, the NO$_3^-$-doped conjugated polymers can be made by the oxidative polymerization of the monomers that form the polymers using a nitrate anion-containing oxidant, such as a metal nitrate. Fe(NO$_3$)$_3$ is one example of a suitable oxidizing agent. The metal initiates polymerization, and the NO$_3^-$ anions become the charge-balancing anions associated with the positively charged polymer backbone chain in order to maintain the electroneutrality of the polymer.

The anion-doped conjugated polymers are highly effective at the selective capture and reduction of gold ions (Au III) and silver ions (Ag$^+$), from solution. In methods for gold and/or silver capture, a sample containing gold and/or silver ions is exposed to the anion-doped polymer, whereby the gold and/or silver ions are adsorbed and then reduced via electroless reduction to form elemental gold and/or silver. The anion-doped polymer, along with the elemental gold and/or silver, can then be removed from the sample. The gold and/or silver can then be removed from the conjugated polymer to regenerate the polymer for re-use. The gold and/or silver ions may be present in a variety of forms in the sample, such as gold and/or silver salts. For example, the gold and/or silver ions may be present in the form of gold halide compounds, including gold chloride, gold bromide, gold iodide, silver halide compounds, including silver chloride, silver bromide, and/or silver iodide.

The nitrate-doped conjugated polymers, such as NO$_3$-PPy, are characterized by high acid stability and the ability to adsorb gold ions and/or silver ions from a gold and/or silver ion-containing sample in acidic aqueous solutions. Acidic pH ranges over which gold and/or silver ions can be adsorbed by the nitrate-doped conjugated polymers include a pH range from 0.5 to 6. This includes adsorption from samples having a pH of 5 or lower, 4 or lower, 3 or lower, 2 or lower, and 1 or lower.

The anion-doped conjugated polymers have high adsorption capacities for gold and/or ions and can adsorb and reduce gold ions and/or silver ions from an aqueous solution quickly. By way of illustration, 99 weight percent (wt. %) or greater of Au(III) ions can be removed from an aqueous sample in a period of five minutes or less using the nitrate-doped conjugated polymers, even when the initial sample contains substantial amounts of the gold ions—for example, when the initial sample has an Au(III) concentration in the range from about 10 ppm to about 3000 ppm.

The morphology of the elemental gold (Au$^0$) or elemental silver (Ag$^0$) precipitated on the polymers may depend on the initial concentrations of Au(III) and Ag$^+$ in the sample solution. Interestingly, flower-like and nano-scale (i.e., having one or more dimensions of less than 1000 nm; more typically less than 100 nm) aggregates of Au$^0$ are observed at lower initial concentration of Au(III) (~100 ppm), while micro-scale and ball-like aggregates of Au$^0$ are formed at higher concentrations (1200 ppm) when NO$_3$-PPy is used, as illustrated in the Example.

Because the rates of gold and/or silver ion adsorption/reduction and the adsorption capacity of the anion-doped conjugated polymers are dependent on solution pH, the pH of the solution can be adjusted to tailor the selectivity of the gold and/or ion adsorption relative to the adsorption of other metal ions present in a sample. For example, the adsorption of Au(III) by NO$_3$-PPy is highly favored relative to Hg$^{2+}$ at pH values of less than 3 and, more desirably, less than 2, (e.g., in the pH range from 1 to 2). The adsorption of Au(III) by NO$_3$-PPy is favored relative to Ag$^+$ at pH values in the range from 2.5 to 4.5. The adsorption of Au(III) by NO$_3$-PPy is highly favored relative to Fe$^{3+}$, Cu$^{2+}$, Pb$^{2+}$, and Cd$^{2+}$.

Examples of sources of Au(III)-containing and Ag$^+$-containing solutions that can benefit from the methods described herein include mine tailings, gold- and/or silver-bearing ores, gold and/or silver ore leachates, and waste from the jewelry, electronics, semiconductor, and dental industries.

In the metal capture applications, the anion-doped conjugated polymers can be provided in a thin membrane form or in a coating or particulate form. Coatings and/or particles of the anion-doped conjugated polymers can be loaded onto a porous support substrate to facilitate the introduction of the anion-doped conjugated polymers into a sample and the removal of the anion-doped conjugated polymers from the sample. Alternatively, the anion-doped conjugated polymers can be packed into a column through which the sample is passed. The anion-doped conjugated polymers can be coated onto support particles housed within the column, or may themselves take the form of polymeric beads housed within the column.

Although the description of the methods for removing gold ions from a sample described above and in the Example, below, focus on the use of a nitrate-doped conjugated polymer, the methods described and claimed herein can also be carried out using the conjugated polymers doped (i.e., charge-balanced) with anions other than nitrate. Such anions include sulfate anions, chloride anions, bromide anions, and acetate anions.

Unless otherwise indicated, temperature- and/or pressure-dependent values disclosed herein refer to those values at room temperature (23° C.) and atmospheric pressure.

EXAMPLE

This Example demonstrates that the conjugated polymer $PPy(NO_3)_x$ can remove Au(III) from solution, with an adsorption capacity of 2185 mg/g, removal rate of >99.99%, $K_d$ value of >$10^7$ mL/g, and low final concentration of <1 ppb within short adsorption time (~5 min). It exhibits a superior selectivity for Au(III) in the presence of much greater quantities of competitive metal ions such as $Cu^{2+}$, $Fe^{3+}$, $Pb^{2+}$, $Cd^{2+}$, $Hg^{2+}$, and $Ag^+$. Meanwhile, Au(III) is reduced to elemental gold ($Au^0$), whose morphology depends on the initial Au(III) concentrations in solution. Interestingly, flower-like and nano-scale aggregates of $Au^0$ are formed at lower initial Au(III) concentration (~100 ppm), while micro-scale and ball-like $Au^0$ aggregates grow from much higher concentration (~1200 ppm). $PPy(NO_3)_x$ is stable in strong acid; thus, it can work at very low pH (pH<1), being competitive for mining applications. The $PPy(NO_3)_x$ shows potential use in selective gold separation and recovery based on its low cost, ease of synthesis, environmental stability, and inherent redox property.

Experimental Section

Materials. Pyrrole (>99%) from Tokyo Chemical Industry and $Fe(NO_3)_3 \cdot 9H_2O$ from Beijing HWRK Chemical Co., Ltd. were used to synthesize the $PPy(NO_3)_x$. $HAuCl_4 \cdot 3H_2O$ from Beijing HWRK Chemical Co., Ltd. was used to prepare series of solutions containing $[AuCl_4]^-$.

Synthesis of $PPy(NO_3)_x$. $PPy(NO_3)_x$ was synthesized via oxidative-polymerization using $Fe^{3+}$ as an oxidant, and $NO_3^-$ ions of $Fe(NO_3)_3 \cdot 9H_2O$ become the counterions to maintain the electroneutrality of the polymer matrix. Briefly, 50 mL $Fe(NO_3)_3 \cdot 9H_2O$ solution (0.023 mol) was added in droplets into 0.69 mL pyrrole (0.01 mol) (molar ratio of $Fe^{3+}$/pyrrole=2.3) under magnetic stirring in the dark for 24 h. Then, the black precipitates were separated with filtration, washed several times with deionized water and ethanol, and vacuum dried for about 6~8 h, isolating the $PPy(NO_3)_x$. CHN elemental analysis was performed to determine the stoichiometric composition of as-prepared $PPy(NO_3)_x$. Based on CHN analyses, the stoichiometric compositions of $PPy(NO_3)_x$ was estimated to be $(C_4H_3N) \cdot (NO_3)_{0.25} \cdot 0.5H_2O$.

Maximum uptakes for Au(III). An amount of 1 g $HAuCl_4 \cdot 3H_2O$ was dissolved in 10 mL ultrapure water to form the mother solution of $[AuCl_4]^-$. A series of stock solutions with 10~2500 ppm of Au(III) were prepared by diluting the mother solution with ultrapure water. Specially, in this Example, all concentrations (ppm) of the solutions containing $[AuCl_4]^-$ were defined in terms of the Au(III). An amount of 0.02 g of $PPy(NO_3)_x$ powder and 20 mL of solution (V/m=1000 mL/g) were mixed and underwent mechanical shaking for 24 h. Then, centrifugation was conducted. The supernatants obtained and their stock solutions were investigated for Au(III) contents of residuals and initial ones, respectively, using inductively coupled plasma-atomic emission spectroscopy (ICP-AES). The solid samples were withdrawn for further characterization.

Adsorption kinetics of Au(III). 0.04 g of $PPy(NO_3)_x$ powder was added into the 40 mL (V/m=1000 mL/g) solution containing ~20 ppm of Au(III), undergoing violent stirring continuously for 1 min, 5 min, 10 min, 30 min, 1 h, 3 h, and 6 h, to check the adsorption kinetics.

Au(III) recovery from solutions containing competitive metal ions. As known, leachates derived from gold-bearing ores or industrial process are usually suffered from a variety of excessive and competitive metal ions, especially $Fe^{3+}$ and $Cu^{2+}$. In order to explore the selectivity for Au(III) (~1 ppm) by $PPy(NO_3)_x$, mixed solutions containing Au(III) (initial concentration of ~1 ppm) and significantly greater amounts of metal ions such as $Ag^+$, $Pb^{2+}$, $Cd^{2+}$, $Hg_2^{2+}$, $Fe^{3+}$ and $Cu^{2+}$ were prepared, and the selectivity for Au(III) was specially further investigated in the cases of huge excess of $Fe^{3+}$ and/or $Cu^{2+}$. In order to weaken the possible interaction between $Cl^-$ of $[AuCl_4]^-$ and these metal ions, taking the case of $Fe^{3+}$ and/or $Cu^{2+}$ as an example, these mixed solutions were prepared by making a $Fe^{3+}$ and/or $Cu^{2+}$ solution firstly, and to this solution the Au(III) solution was added.

Data treatment. The distribution coefficient ($K_d$) is defined by the equation of $K_d=(V[(C_0-C_f)/C_f])/m$, where $C_0$ and $C_f$ are respectively the initial and equilibrium concentrations of $M^{n+}$ (ppm, μg/mL) after the contact, V is the solution volume (mL), and m is the solid amount (g). The % removal is calculated with the equation of $100 \times (C_0-C_f)/C_0$. The removal capacity ($q_m$) is given by the equation: $q_m=10^{-3} \times (C_0-C_f) \cdot V/m$. In general, the adsorption experiments were performed with V:m ratios of 1000 mL/g at ambient temperature.

Characterization techniques. The XRD patterns of solid samples were collected using a PANalytical X'pert Pro MPD diffractometer with Cu-Kα radiation at room temperature, with step size of 0.0167°, scan time of 10 s per step, and 2θ ranging from 4.5 to 70°. Fourier transformed infrared (FT-IR) spectra of the samples were recorded on a Nicolet-380 Fourier-Transform infrared spectrometer using the KBr pellet method. Raman spectra were recorded from 100 to 2000 $cm^{-1}$ on a microscopic confocal Raman spectrometer (LabRAMAramis Horiba Jobin Yvon), using a 532 nm He—Ne laser. SEM and energy disperse spectroscopy (EDS) measurements were carried out using a Hitachi S-4800 microscope. XPS of the solid samples after the adsorption experiments were performed using an ESCALAB 250Xi spectrometer (Thermofisher). The peaks were fitted using the software Avantage.

The metal ion concentrations in stock solutions and supernatant solutions after adsorptions were measured using ICP-AES (Jarrel-ASH, ICAP-9000). C, H, and N contents of the solid samples were determined using an Elementar Vario EL elemental analyzer. The pH measurements were conducted to initial solutions and supernatants after adsorption using a Sartorius universal type pH meter (PB-10).

Results and Discussion

Characterization of $PPy(NO_3)_x$ materials. Chemical polymerization is a simple and widely used method to obtain powdered PPy with high yield. In this strategy, the oxidants needed for successful polymerization are as follows: $(NH_4)_2S_2O_8$, $H_2O_2$, and a salt of a transition metal ion. (Rao, C. R. K. et al., *Indian Journal of Chemistry Section a-Inorganic Bio-Inorganic Physical Theoretical & Analytical Chemistry* 2013, 52, 744.) $Fe^{3+}$ salts (such as $FeCl_3$ and $Fe_2(SO_4)_3$) are versatile oxidizing agents for the preparation of PPy because the oxidation potential of $Fe^{3+}$ ($Fe^{3+}+e^-\rightarrow Fe^{2+}$, $E^0=0.77$ V) matches well with the polymerization potential of pyrrole; thus, the as-prepared PPy is not overoxidized and possesses higher conductivity. Here the $NO_3^-$ ions of $Fe(NO_3)_3\cdot 9H_2O$ act as the dopant to maintain the electroneutrality of the polymer matrix.

Figure 1A:
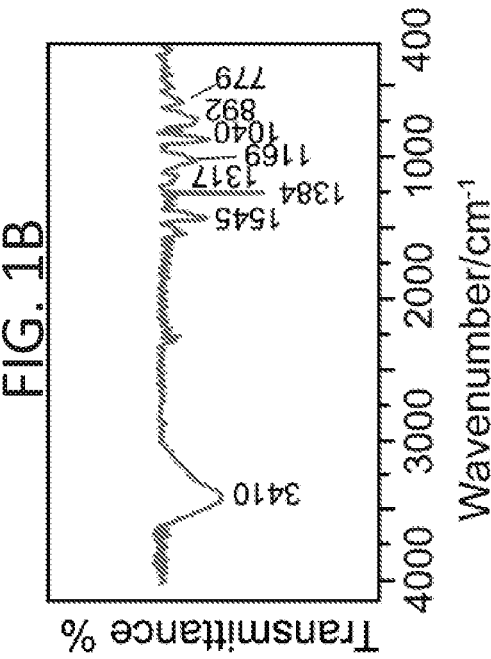
FIG. 1A shows X-ray diffraction (XRD) and FIG. 1B shows infrared (IR) spectra of $NO_3$-PPy.
Figure 1B:
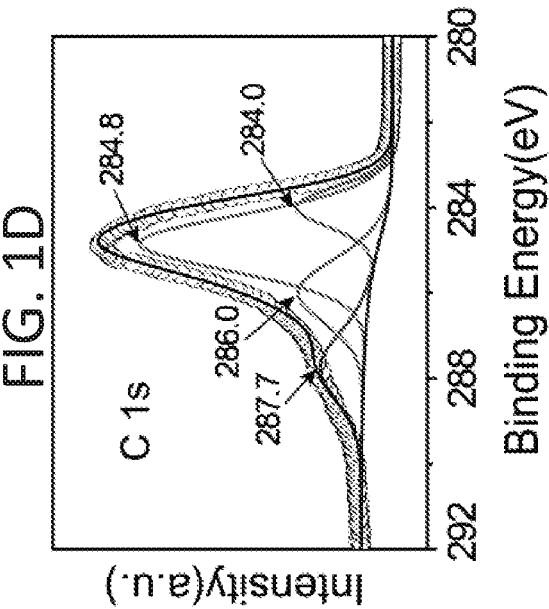
Figure 1C:
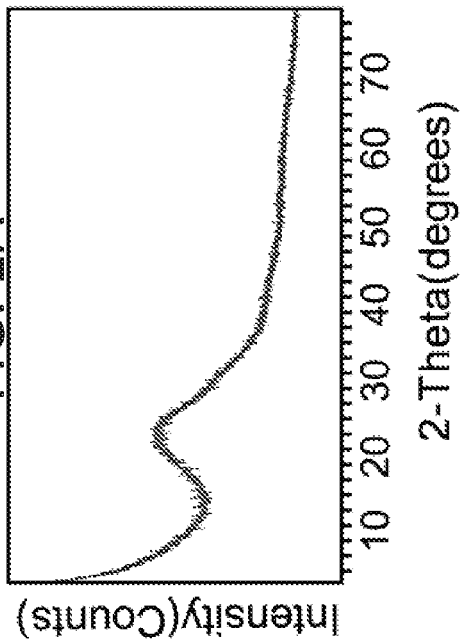
FIGS. 1C-1D show X-ray photoelectron spectra with the deconvolution of XPS peaks of (FIG. 1C) N is and (FIG. 1D) C 1s in $PPy(NO_3)_x$.
Figure 1D:
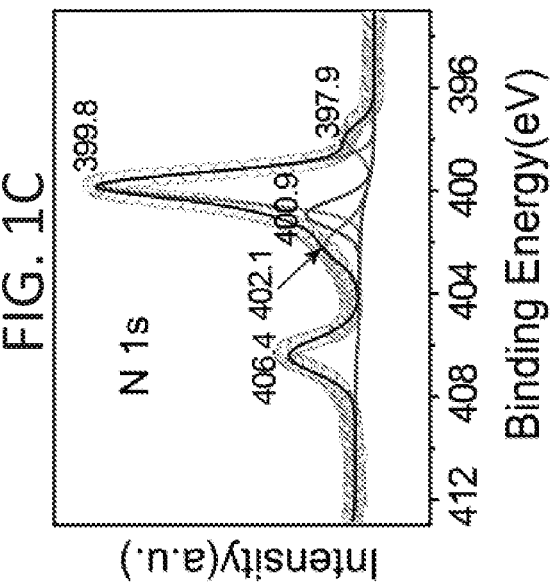

The XRD pattern of as-obtained $PPy(NO_3)_x$ (FIG. 1A) only shows a broad peak centered at $2\theta=24°$, indicating the amorphous structure of PPy. The FT-IR spectra (FIG. 1B) present several characteristic bands at 3410, 1545, 1317, 1040 and 892 cm$^{-1}$, which are attributed to N—H stretching vibration, C—C backbone stretching, C—N stretching vibration, C—H in-plane deformation vibration, and C—H out-of-plane bending, respectively. The strong band at 1384 cm$^{-1}$ belongs to the $NO_3^-$ dopants. The chemical states of C and N elements in original $PPy(NO_3)_x$ are shown as FIGS. 1C and 1D. The N 1s core-level spectra (FIG. 1C) was decomposed into four components. The peaks centered at 397.9 and 399.8 eV were attributed to imine (—N=) and amine (—NH—) nitrogen atoms, respectively. Two peaks centered at 400.9 and 402.1 eV were derived from the positively charged nitrogen atoms ($N^+$) corresponding to any particular intrinsic oxidation states or protonated nitrogen atoms with positive charges. Besides, the peak of nitrate ($NO_3^-$) centered at around 406.4 eV. The C is core-level spectra (FIG. 1D) was well curve-fitted with four spin-orbit peaks. The peaks occurring at 284.0 and 284.8 eV were attributed to C=C bonding of pyrrole rings and C—C bonding, respectively. Two peaks at 286.0 and 287.7 eV revealed the presence of C—N and C=N bonding.

Maximum uptake towards Au(III) using $PPy(NO_3)_x$. With the increasing concentration from 100 to 2500 ppm of solutions containing Au(III), an ultrahigh capture capacity of 2185 mg/g as well as a mmol Au/mol PPy ratio of 992.8 (~1 mol Au/mol PPy) was achieved (Table 1), demonstrating the great capability of gold recovery by $PPy(NO_3)_x$.

Figures 2A, 2B:
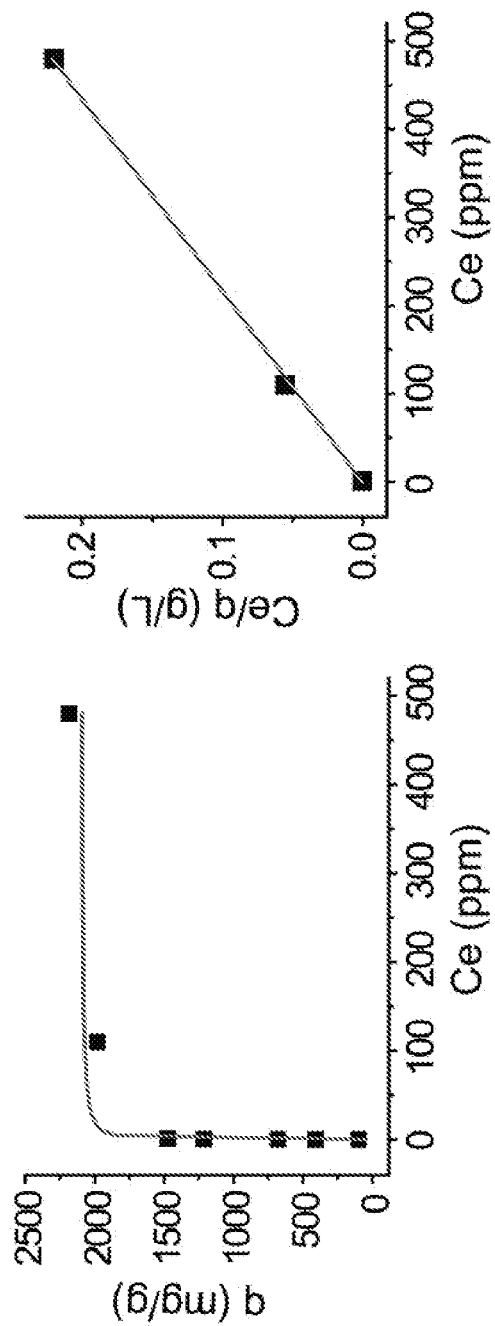
FIGS. 2A-2B show sorption isotherms for sorption of Au(III) by $PPy(NO_3)_x$. Langmuir equilibrium isotherms were derived from equilibrium concentration ($C_e$, ppm), plotted against the adsorption capacity (FIG. 2A) q (mg/g) and (FIG. 2B) $C_e/q_e$ (g/L).
Figure 3B:
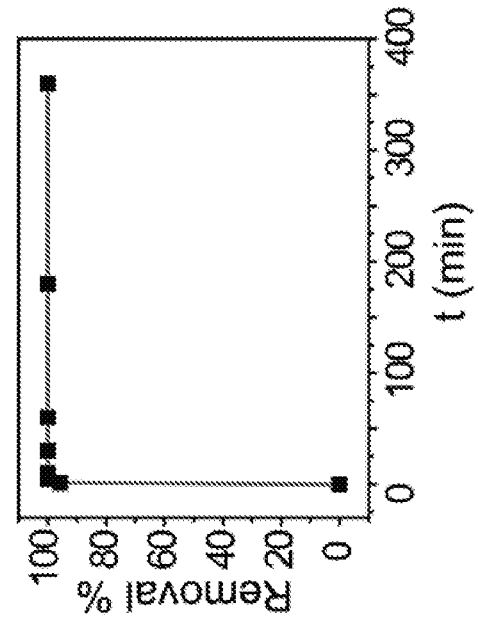
FIGS. 3A-3D show adsorption kinetics curves for Au(III) by $PPy(NO_3)_x$.
Figure 3D:
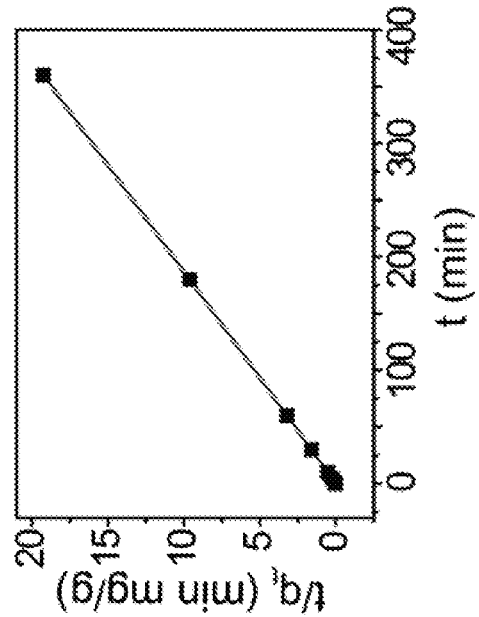
Figure 3A:
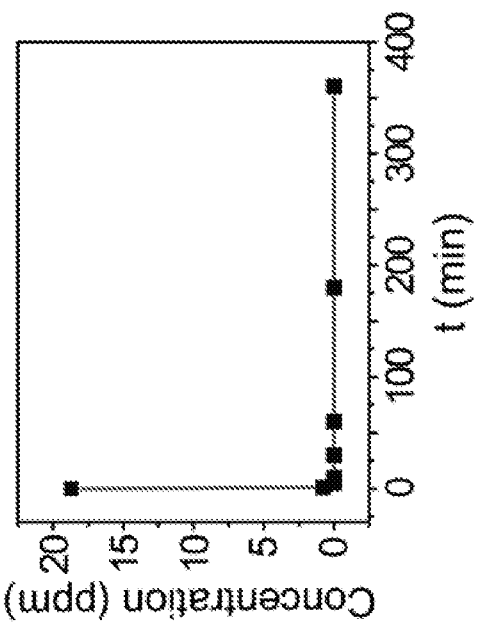
Figure 3C:
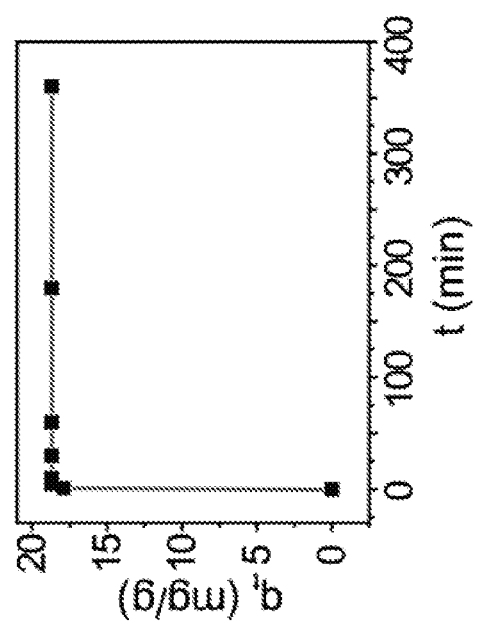
Figure 4A:
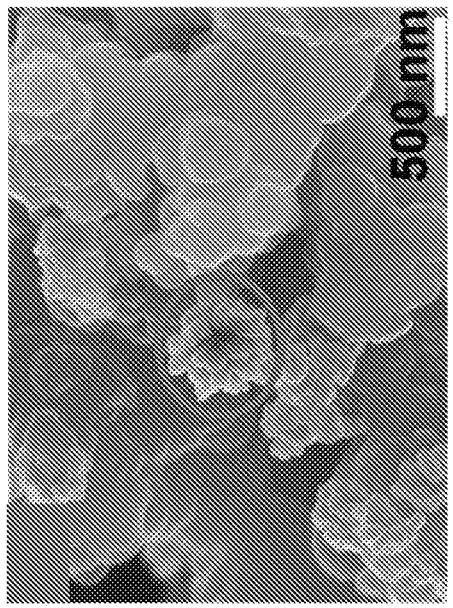
FIGS. 4A-4D show scanning electron microscope (SEM) images of solid samples after $PPy(NO_3)_x$ adsorbed 100 ppm Au(III).
Figure 4B:
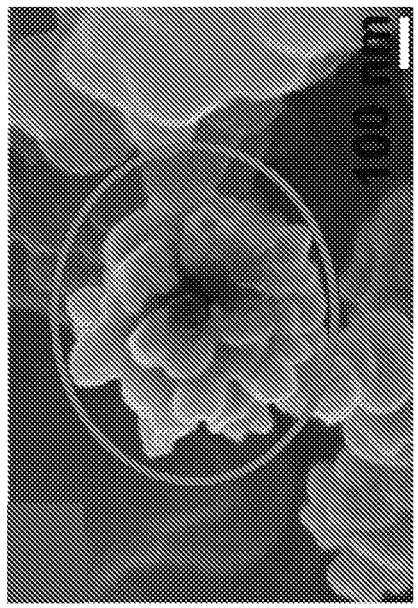
Figure 4C:
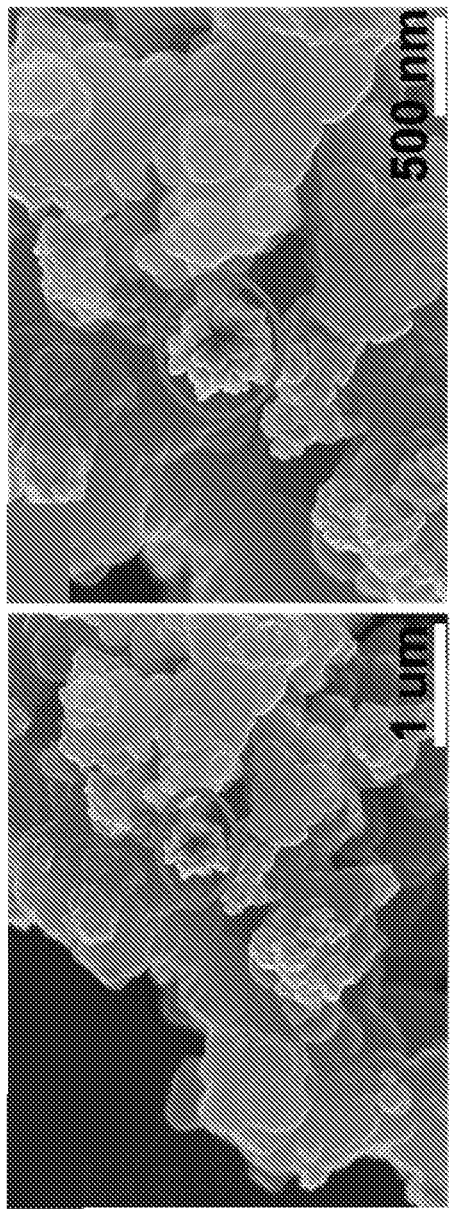
Figure 4D:
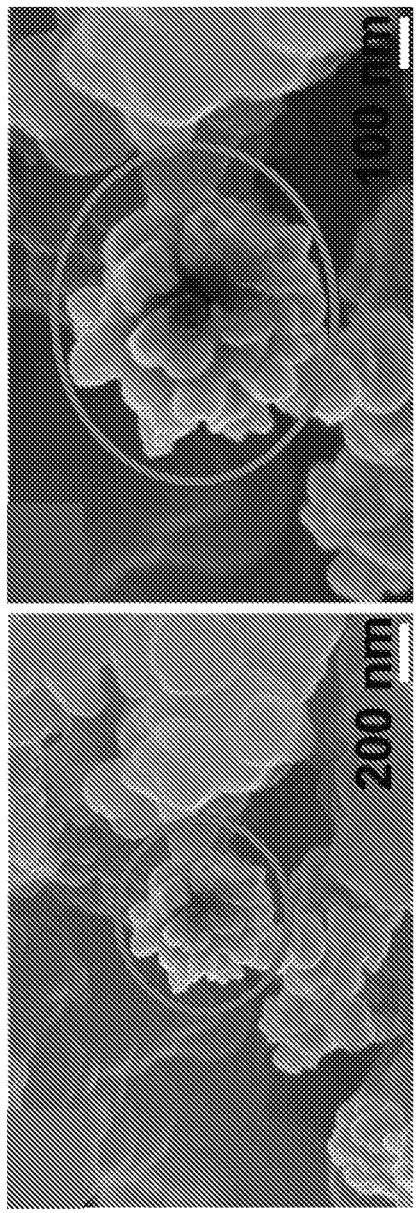

Generally, experimental data of uptake capacity are illustrated with Langmuir isotherm curves to investigate the possible sorption process. The Langmuir isotherm model and its liner form are defined as Eq. (1) and Eq. (2): (Langmuir, I. *Journal of the American Chemical Society* 1918, 40, 1361.)

$$q_e = q_m \frac{bCe}{1+bCe} \qquad \text{Eq. (1)}$$

$$\frac{C_e}{q_e} = \frac{C_e}{q_m} + \frac{1}{q_e K_L} \qquad \text{Eq. (2)}$$

where $q_e$ (mg/g) is the equilibrium adsorption capacity, $c_e$ (mg/L) is the ion concentration at equilibrium, $q_m$ (mg/g) is the theoretical maximum sorption capacity, and $K_L$ (L/mg) is the Langmuir constant. In this model, the adsorbed substance is supposed to undergo monolayer type coverage on the adsorbent surface; briefly, there is a one-to-one correspondence between the sorption capacity and the adsorption site. The equilibrium adsorption isotherms of Au(III) was shown in FIGS. 2A-2B. The data points were well-fitted with the Langmuir model with a correlation coefficient ($R^2$) of 0.988 (FIG. 2A), indicating the capture process of Au(III) by $PPy(NO_3)_x$ is a monolayer adsorption. The expected $q_m^{Au}$ of 2106 mg/g was obtained from its Langmuir isotherm model, which was close to the experimental value of 2185 mg/g (Table 1). To determine whether the adsorption is favorable, a dimensionless constant separation factor or equilibrium parameter ($R_L$) is defined as the Eq. (3): (Weber, T. W. et al., *Aiche Journal* 1974, 20, 228.)

$$R_L = \frac{1}{1+K_L C_0} \qquad \text{Eq. (3)}$$

where $K_L$ (L/mg) is the Langmuir isotherm constant in Eq. (2), and $C_0$ (mg/L, ppm) is the initial metal concentration. Different $R_L$ values indicate different types of the isotherm: favorable ($0<R_L<1$), unfavorable ($R_L>1$), linear ($R_L=1$), or irreversible ($R_L=0$). The $R_L$ value ranged in 0-1 in the present case shows the favorable isotherm.

Sorption kinetics study of Au(III) using $PPy(NO_3)_x$. With the initial concentration of ~18 ppm for Au(III) (not the $[AuCl_4]^-$), an extremely rapid and highly efficient removal was achieved only within 5 min with >99.99% removal rate and >$10^7$ mL/g of $K_d$. value. More importantly, the sharply decreased concentration of <1 ppb makes the $PPy(NO_3)_x$ a useful material for the extraction of traces of gold from some industrial or mineral leachates (about 0.003~1.7 ppm of Au).

To investigate the sorption rate, two rate equations known as pseudo-first-order and pseudo-second-order mechanisms are needed for further study. The equations are defined as follows: (Azizian, S. *Journal of Colloid and Interface Science* 2004, 276, 47.)

Pseudo-first-order:
$$\ln(q_e - q_t) = \ln q_e - k_1 t \qquad \text{Eq. (4)}$$

Pseudo-second-order:
$$\frac{t}{q_t} = \frac{1}{k_2 q_e^2} + \frac{t}{q_e} \qquad \text{Eq. (5)}$$

where $q_e$ (mg/g) is the adsorbed amount per unit mass of adsorbent at equilibrium and $q_t$ (mg/g) is the adsorbed mass at time t, while $k_1$ (min$^{-1}$) and $k_2$ (g/mg min$^{-1}$) are corresponding equilibrium rate constants. The $k_1$ value was obtained by plotting $\ln(q_e-q_t)$ against t and the $k_2$ by plotting $t/q_t$ against t.

Corresponding kinetic curves following the pseudo-second-order model were shown as FIGS. 3A-3D. The kinetics parameters determined by the linear relationship of $t/q_t$ against t show that the calculated sorption capacity ($q_{e,\,cal}$) (18.7 mg/g) is well-fitted with the experimental value ($q_{e,\,exp}$) (18.7 mg/g) with the fit coefficient ($R^2$) close to 1, indicating the adsorption for Au(III) by $PPy(NO_3)_x$ undergo a pseudo-second-order kinetic mechanism and a chemisorption process.

Selectivity for Au(III) from great excess of metal ions by $PPy(NO_3)_x$.

Experiments on mixed solutions containing Au(III) and other metal ions (such as $Ag^+$, $Pb^{2+}$, $Cd^{2+}$, $Hg^{2+}$, $Fe^{3+}$ and $Cu^{2+}$) were carried out to explore the selectivity for Au(III) using $PPy(NO_3)_x$. These ions were selected because they are likely to be present in far greater excess in raw leachate mining solutions in real world conditions.

The sorption results shown in Table 3 indicate extremely efficient removal of Au(III) with rates ranging from 97.6 to 99.2% in the cases of Au(III)/$Ag^+$/$Hg^{2+}$ (0.04/202/111 ppm), Au(III)/$Ag^+$/$Cu^{2+}$ (0.119/206/477 and 0.094/198/1896 ppm), and Au(III)/$Ag^+$/$Cu^{2+}$/$Pb^{2+}$/$Cd^{2+}$ (0.102/208/489/499/243 ppm). The $K_d$(Au) values of $10^4$~$10^6$ mg/L (Table 3)

indicate the much better affinity of PPy(NO$_3$)$_x$ for Au(III) than other metal ions. Meanwhile, poor removals (3.6-38.4%) for Ag$^+$ and nearly no adsorption towards Cu$^{2+}$, Pb$^{2+}$, Cd$^{2+}$, and Hg$^{2+}$ (Table 3) were also obtained. The separation factor (SF$_{A/B}$) defined by K$_d^A$/K$_d^B$ is generally used to assess the separation ability for one ion from the other. Taking the case of Au(III)/Ag$^+$/Cu$^{2+}$/Pb$^{2+}$/Cd$^{2+}$ as an example, the SF$_{Au/Ag}$, SF$_{Au/Cu}$, SF$_{Au/Pb}$, and SF$_{Au/Cd}$ values were determined to be 161 (=(1.0×10$^5$)/(6.2×10$^2$)), 1.4×10$^4$ (=(1.0×10$^5$)/7.4), 4.5×10$^3$ (=(1.0×10$^5$)/22), and 1.3×10$^4$ (=(1.0×10$^5$)/8.0), respectively, indicating the highly selective Au(III) recovery by PPy(NO$_3$)$_x$, despite the strong interference of competitive metal ions. Uptake experiments were also performed on mixtures of Au(III) with enormous amounts of Fe$^{3+}$ and/or Cu$^{2+}$ (Table 4). Perfect removals towards Au(III) were observed with final concentrations of <1 ppb, and the Au(III) K$_d$ values were in the range of 10$^4$~10$^6$ mg/L, while nearly no adsorption was observed for Fe$^{3+}$ and Cu$^{2+}$.

The sorption capability towards each metal ion was investigated in their individual cases (Table 5). With the initial concentration of ~10 ppm for each ion, PPy(NO$_3$)$_x$ achieved nearly complete removal for Au(III) (99.99%); however, poor adsorption for Ag$^+$, Fe$^{3+}$ Hg$^{2+}$ and Cu$^{2+}$ was observed. All the data discussed above demonstrate that the PPy(NO$_3$)$_x$ is outstanding for extracting Au(III) especially from complicated solution systems.

Characterization of Au(III)-loaded samples by PPy(NO$_3$)$_x$. After Au(III) sorption, colorless supernatants (the initial Au(III) solution was light yellow color) and brown Au-loaded solids (the original PPy(NO$_3$)$_x$ was black) were observed. SEM analysis was used to investigate the morphology of the solids obtained from the post-sorption solutions of 100 (FIGS. 4A-4D) and 1200 ppm Au(III) (FIGS. 5A-5D), respectively. At Au(III) initial concentration of 100 ppm (FIGS. 4A-4D), aggregates of Au$^0$ nanoparticles with nanoscale size and flower-like objects with a diameter of ~400 nm (marked with circles on FIGS. 4A-4D) were observed. The majority of Au$^0$ nanoparticles were determined to be ~50 nm (FIGS. 4A-4D). At 1200 ppm Au(III) concentration (FIGS. 5A-5D), some angular and ball-like aggregates with micron-scale (diameter of the ball is 1-2 μm) were crystallized, which was demonstrated to be Au$^0$ via elemental distribution mapping (FIGS. 5A-5D), suggesting the adsorbed Au(III) was reduced to Au$^0$ by the PPy (NO$_3$)$_x$.

Figure 6:
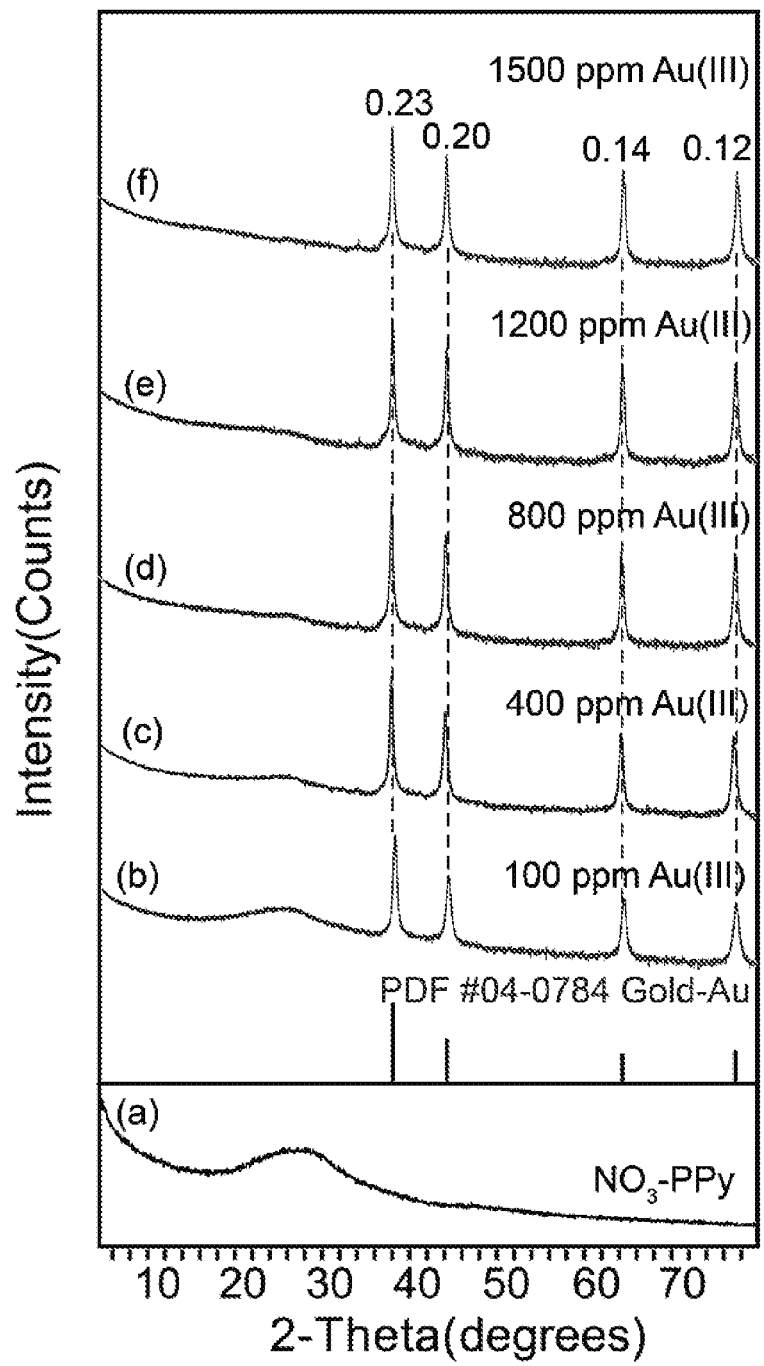
FIG. 6, traces (a)-(f), shows XRD patterns of (trace (a)) $PPy(NO_3)_x$ and solid samples after adsorbed (trace (b)) 100 ppm Au(III), (trace (c)) 400 ppm Au(III), (trace (d)) 800 ppm Au(III), (trace (e)) 1200 ppm Au(III), (trace (f)) 1500 ppm Au(III), respectively.

XRD patterns of the Au-loaded solids showed the clear presence of Bragg reflections with d values of 0.23, 0.20, 0.14, and 0.12 nm arising from the Au metal (FIG. 6, traces (a)-(f)). For the cases of Au(III)/Fe$^{3+}$, Au(III)/Cu$^{2+}$, and Au(III)/Fe$^{3+}$/Cu$^{2+}$ (FIG. 7A), there was no obvious difference of the Au(III)/Fe$^{3+}$ (1/1000 ppm) (FIG. 7A, trace (b)) and Au(III)/Fe$^{3+}$/Cu$^{2+}$ (1/100/100 ppm) (FIG. 7A, trace (d)) from the original PPy(NO$_3$)$_x$ (FIG. 7A, trace (a)). When the initial concentration of Cu$^{2+}$ was up to ~1000 ppm, some new reflections were observed and attributed to the copper complex of (Cu$_4$(NO$_3$)$_2$(OH)$_6$), with the standard pattern of (Cu$_4$(NO$_3$)$_2$(OH)$_6$) shown as in FIG. 7B in particular.

Figures 8A, 8B:
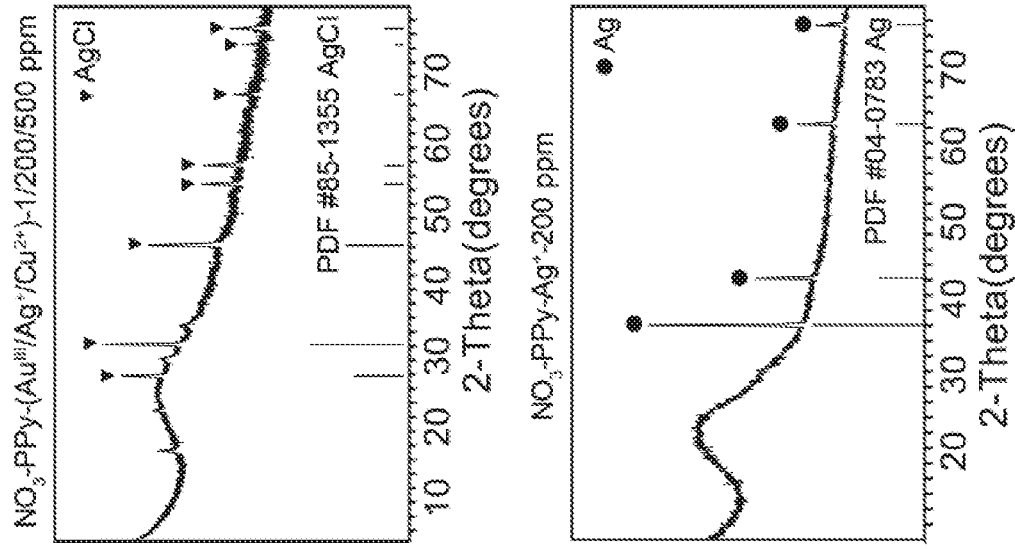
FIGS. 8A-8D show XRD patterns of solid samples after $PPy(NO_3)_x$ adsorbed mixtures of (FIG. 8A) $Au(III)/Ag^+/Hg^{2+}$, (FIGS. 8B-8C) $Au(III)/Ag^+/Cu^{2+}$ and (FIG. 8D) 200 ppm $Ag^+$.
Figures 8C, 8D:
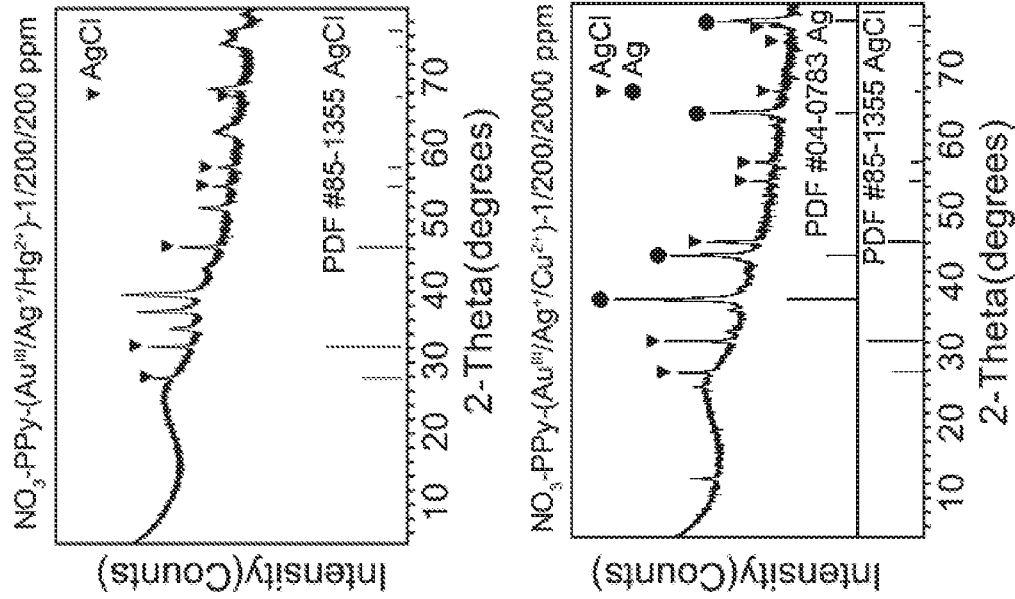

Interestingly, for the Ag$^+$ present case, for examples of Au(III)/Ag$^+$/Hg$^{2+}$ (FIG. 8A) and Au(III)/Ag$^+$/Cu$^{2+}$ (FIGS. 8B-8C), all post-sorption solid samples showed diffraction characteristic of AgCl. For the case of 1/200/2000 ppm Au(III)/Ag$^+$/Cu$^{2+}$ (FIG. 8C), except for the peaks of AgCl, a set of reflections could also be attributed to Ag$_0$ metal. While for the solution with single Ag$^+$, the XRD pattern (FIG. 8D) demonstrated the formation of Ag$_0$ metal. This indicates the successful reduction of Ag$^+$ due to the inherent redox ability of PPy. There were still some reflections possibly belonging to the complicated complexes resulting from the hydrolysis of these metal ions. The results suggest that, for the [AuCl$_4$]$^-$ case with Cl$^-$, the Ag$^+$ would prefer to interact with the Cl$^-$ of [AuCl$_4$]$^-$, resulting in the by-product of AgCl. This ensures the preferential extraction of Au$^0$ for Au/Ag concomitant systems. The presence of more Cu$^{2+}$ (FIG. 8C) is likely to be helpful for weakening this interaction via bonding competition and thus benefits the direct capture for Ag$^+$ by PPy(NO$_3$)$_x$.

Figure 9:
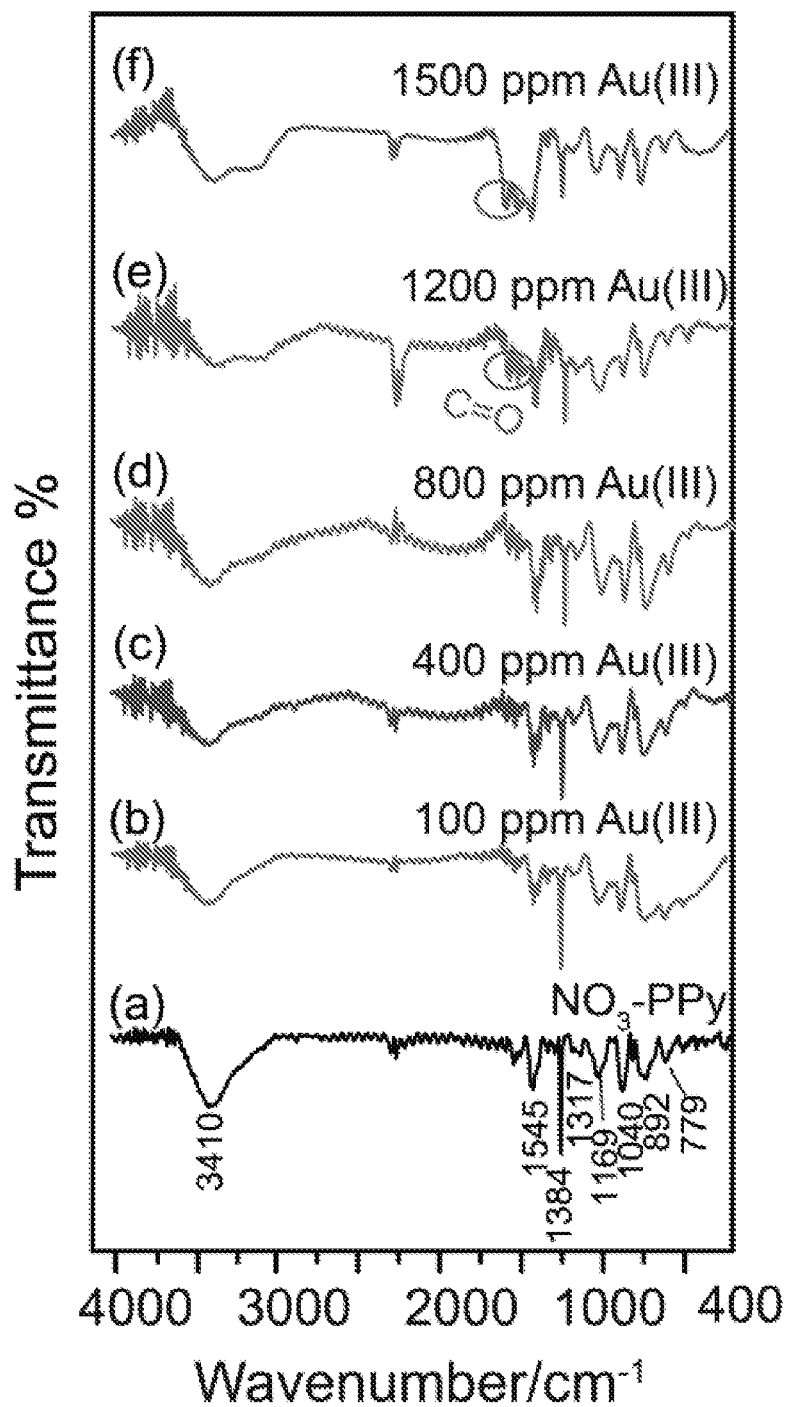
FIG. 9, traces (a)-(f), shows IR spectra of $PPy(NO_3)_x$ (trace (a)) and solid samples after $PPy(NO_3)_x$ adsorbed 100 ppm Au(III) (trace (b)), 400 ppm Au(III) (trace (c)), 800 ppm Au(III) (trace (d)), 1200 ppm Au(III) (trace (e)), 1500 ppm Au(III) (trace (f)), respectively.

IR spectra of the Au-loaded samples (FIG. 9, traces (b)-(f)) showed absorption bands similar to those of PPy (NO$_3$)$_x$ (FIG. 9, trace (a)). However, in the cases with higher Au(III) concentrations (>1200 ppm) (FIG. 9, traces (e) and (f)), new bands appeared at 1660~1700 cm$^{-1}$, which are attributed to the stretching vibrations of C=O groups, potentially resulting from extensive oxidation of the PPy backbone during the redox-adsorption process. The weaker intensity of NO$_3^-$ (1384 cm$^{-1}$) (FIG. 9, traces (b)-(f)) can be interpreted that some NO$_3^-$ were away from the PPy matrix with the increasing amount of adsorbed [AuCl$_4$]$^-$ to maintain the charge balance of PPy.

XPS spectra of C, N, and Au of samples after PPy(NO$_3$)$_x$ adsorbed 100 ppm (FIGS. 10A-10C) and 1200 ppm Au(III) (FIGS. 10D-10F) were investigated in detail. For the 100 ppm Au(III), peaks at 398.0, 399.9, 401.0, and 402.0 eV (FIG. 10A) attributed to imine nitrogen (—N=), amine nitrogen (—NH—), and positively nitrogen (N$^+$) atoms were observed, respectively, and the peak at 406.4 eV was assigned to the nitrogen of NO$_3^-$. The characteristics of C=C, C—C, C—N, and C=N bonding were centered at 284.1, 284.8, 285.9, and 287.6 eV (FIG. 10B), respectively. The data above are similar to the element states of PPy (NO$_3$)$_x$ (FIG. 1C), demonstrating the intrinsic structure of PPy(NO$_3$)$_x$ remains.

Figures 10A, 10B, 10C:
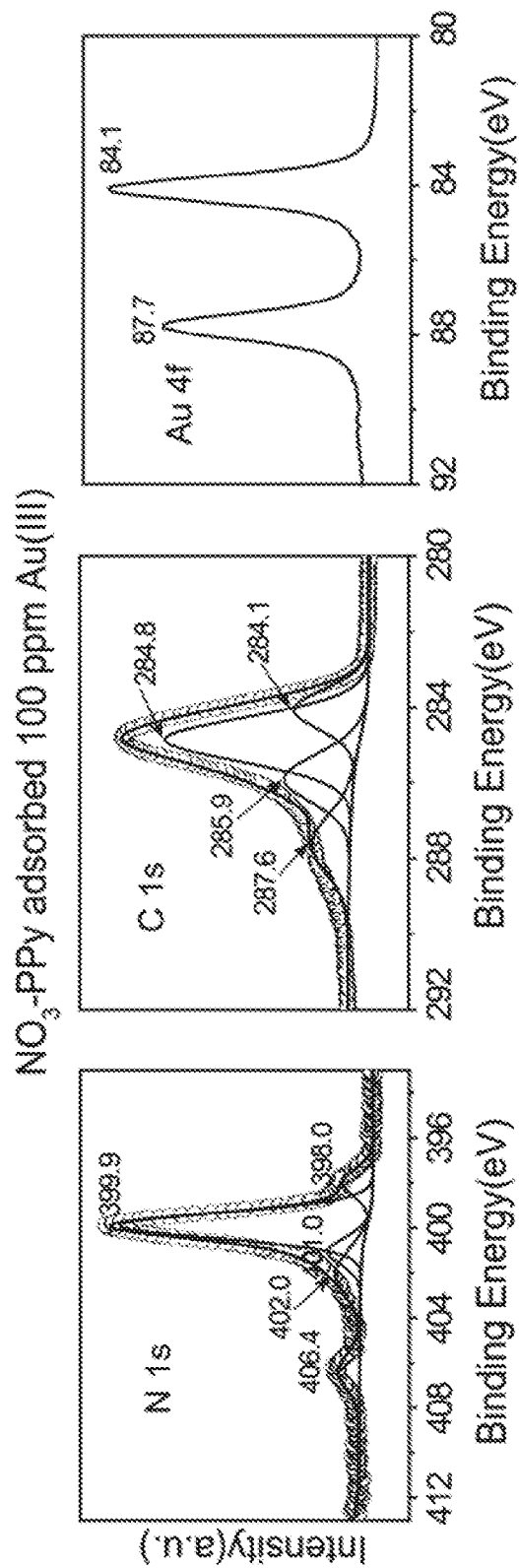
FIGS. 10A-10F show X-ray photoelectron spectra with the deconvolution of XPS peaks of PPy(NO$_3$)$_x$ after adsorbed (FIGS. 10A-10C) 100 ppm and (FIGS. 10D-10F) 1200 ppm Au(III), respectively.
Figures 10D, 10E, 10F:
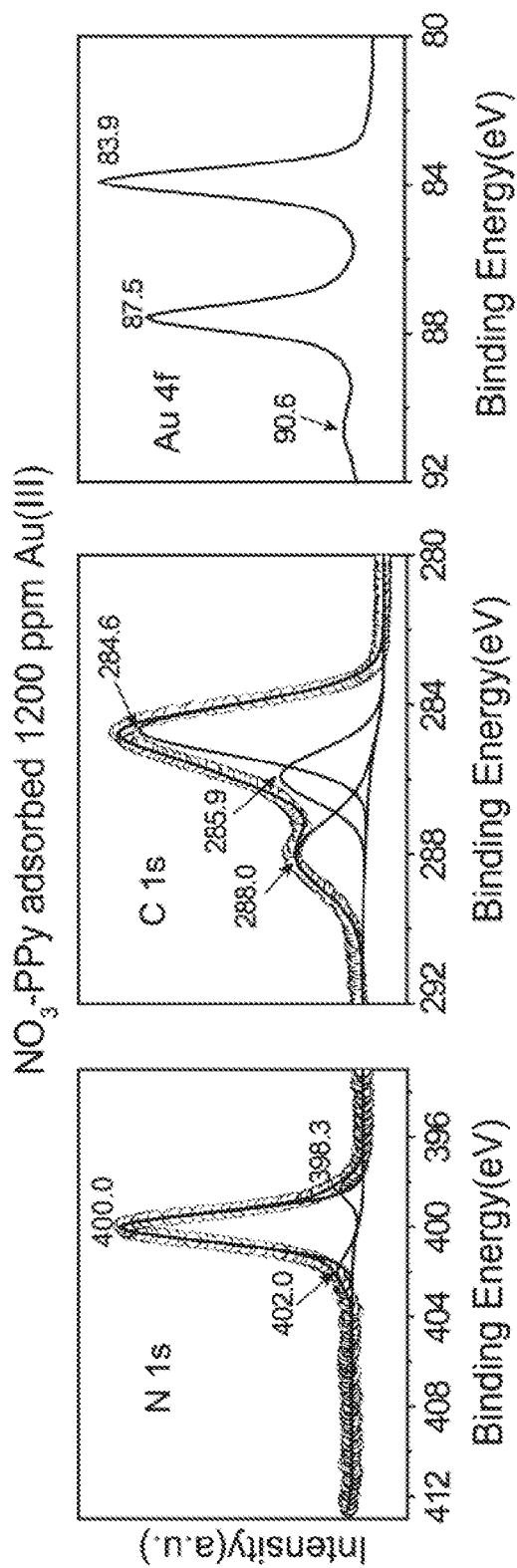

The Au 4f core-level spectra (FIG. 10C) presented a single Au species with two peaks at 84.1 (Au 4f$_{7/2}$) and 87.7 (Au 4f$_{5/2}$) eV, characteristic of Au$^0$, in good agreement with the XRD analysis (FIG. 6). For the 1200 ppm Au(III) (FIGS. 10D-10F), the N 1s spectra (FIG. 10D) showed three components at 398.3, 400.0, and 402.0 eV. The markedly weak peak at 402.0 eV and the absence of peak at ~406 eV (FIG. 10D) indicate the decreased amount of positive nitrogen (N$^+$) atoms and the decrease of NO$_3^-$ in the PPy matrix. The C 1s spectra (FIG. 10E) presenting three peaks was much different from that of original C states (FIG. 1C) and the post-adsorbed sample at low Au(III) concentration of 100 ppm (FIG. 10B). The strong singlet at 284.6 eV and the absence of ~284.1 eV suggest the predominant existing form of C—C, while the obviously enhanced band at 288.0 eV possibly resulted from the overlap of C=N and C=O bonding, consistent with IR data (FIG. 9, traces (e)-(f)) discussed above. That is, the structure of pyrrole rings has changed after the absorption of large amounts of Au(III), resulting in C=O groups. The Au 4f peaks (FIG. 10F) attributed to Au$^0$ were observed at 83.9 (Au 4f$_{7/2}$) and 87.5 (Au 4f$_{5/2}$) eV; moreover, the very weak peak centered at ~90.6 eV indicates the presence of [AuCl$_x$]$^-$ in small amounts, showing the replacement of the counter anions of NO$_3^-$ by [AuCl$_x$]$^-$ in the PPy matrix.

In short, PPy(NO$_3$)$_x$ is capable of reducing Au(III) to Au$^0$ relying on its inherent electroactivity and the high oxidation potential of Au(III) ([AuCl$_4$]$^-$+3e$^-$→Au$^0$, E$^0$=1.20 V). The lack of such redox driving force in the other metal ions is the basis for the extreme selectivity of the material for Au. The mechanism of this redox adsorption varies in different cases: a) In a case of lower Au(III) concentration (such as ~100 ppm), the reduction process is achieved mainly because of the electroactivity of PPy(NO$_3$)$_x$. In this case, it was deduced that one pyrrole molecule provides 0.25 e$^-$; that is, 1 g PPy(NO$_3$)$_x$ (molecular mass is determined to be 89.5) has $2.8 \times 10^{-3}$ ($=1/89.5 \times 0.25$) mol available electrons. Theoretically, 183.4 ($=(2.8 \times 10^{-3})/3 \times 196.97$) mg of Au(III) can be reduced to Au(0). b) In much higher concentration cases of Au(III) (such as 1200 ppm), the backbone of PPy(NO$_3$)$_x$ is transformed into a new one containing protonated or oxidative groups such as C=O, derived from the hydrolysis reactions because of its reversible redox states. In this case, if one pyrrole provides 2 e$^-$, 1 g PPy(NO$_3$)$_x$ (molecular mass is about 89.5) has $2.2 \times 10^{-2}$ ($=1/89.5 \times 2$) mol electrons. Theoretically, 1467 ($=(2.2 \times 10^{-2})/3 \times 196.97$) mg of Au(III) can be reduced to Au(0), which is lower than the experimental value (2185 mg/g), suggesting that ion-exchange of [AuCl$_x$]$^-$ with NO$_3^-$ and also some physical adsorption of the [AuCl$_x$]$^-$ are also at work. The adsorption process is shown as FIG. 11.

TABLE 1

Sorption data of PPy(NO$_3$)$_x$ towards Au(III). [a]

| $C_0$ (ppm) | $C_f$ (ppm) | Removal (%) | $K_d$ (mL/g) | $q_m$ (mg/g) | mmol Au/ mol PPy |
|---|---|---|---|---|---|
| 99.1[b] | <0.001 | >99.99 | >9.9 × 10$^7$ | 99.1 | 45.0 |
| 407[c] | 0.04 | 99.99 | 9.3 × 10$^6$ | 406.9 | 184.9 |
| 679[d] | 0.10 | 99.98 | 6.8 × 10$^6$ | 678.9 | 308.5 |
| 1215[e] | 0.34 | 99.97 | 3.6 × 10$^6$ | 1214.7 | 551.9 |
| 1474[f] | 1.08 | 99.92 | 1.4 × 10$^6$ | 1472.9 | 669.3 |
| 2092[g] | 110 | 94.8 | 1.8 × 10$^4$ | 1982.0 | 900.6 |
| 2665[h] | 480 | 82.0 | 4.5 × 10$^3$ | 2185.0 | 992.8 |

[a] m = 0.02 g, V = 20 mL, V/m = 1000 mL/g; contact time: 24 h.
pH value: [b]3.21→2.83, [c]2.76→2.29, [d]2.63→2.11, [e]2.42→1.88, [f]2.35→1.76, [g]2.21→1.67, [h]2.12→1.61.

TABLE 2

Kinetics data of Au(III) using PPy(NO$_3$)$_x$. [a,b]

| $C_0$ (ppm) | time (min) | $C_f$ (ppm) | Removal (%) | $K_d$ (mL/g) | $q_t$ (mg/g) |
|---|---|---|---|---|---|
| 18.7 | 1 | 0.77 | 95.80 | 2.3 × 10$^4$ | 17.9 |
|  | 5 | <0.001 | >99.99 | >1.8 × 10$^7$ | 18.7 |
|  | 10 | <0.001 | >99.99 | >1.8 × 10$^7$ | 18.7 |
|  | 30 | <0.001 | >99.99 | >1.8 × 10$^7$ | 18.7 |
|  | 60 | <0.001 | >99.99 | >1.8 × 10$^7$ | 18.7 |
|  | 180 | <0.001 | >99.99 | >1.8 × 10$^7$ | 18.7 |
|  | 360 | <0.001 | >99.99 | >1.8 × 10$^7$ | 18.7 |

[a] m = 0.04 g, V = 40 mL, V/m = 1000 mL/g; pH value: [b]3.74→3.08.

TABLE 3

Removal of PPy(NO$_3$)$_x$ towards mixture of Au(III) and other metal ions.

| Mixed ions | $C_0$ (ppm) | $C_f$ (ppm) | Removal (%) | $K_d$ (mL/g) |
|---|---|---|---|---|
| Au(III)/Ag$^+$/Hg$^{2+}$ | Au(III): 0.043 | <0.001 | >97.6 | >4.2 × 10$^4$ |
| (pH: 1.73→1.72) | Ag$^+$: 202 | 194 | 3.6 | 38.0 |
|  | Hg$^{2+}$: 111 | 110 | / | / |
| Au(III)/Ag$^+$/Cu$^{2+}$ | Au(III): 0.119 | <0.001 | >99.2 | >1.2 × 10$^5$ |
| (pH: 4.37→2.98) | Ag$^+$: 206 | 134 | 34.7 | 5.3 × 10$^2$ |
|  | Cu$^{2+}$: 477 | 468 | 1.95 | 19.9 |
| Au(III)/Ag$^+$/Cu$^{2+}$ | Au(III): 0.094 | <0.001 | >98.9 | >9.3 × 10$^4$ |
| (pH: 4.35→3.01) | Ag$^+$: 198 | 131 | 33.9 | 5.1 × 10$^2$ |
|  | Cu$^{2+}$: 1896 | 1915 | / | / |
| Au(III)/Ag$^+$/Cu$^{2+}$/ | Au(III): 0.102 | 0.001 | 99.0 | 1.0 × 10$^5$ |

TABLE 3-continued

Removal of PPy(NO$_3$)$_x$ towards mixture of Au(III) and other metal ions.

| Mixed ions | $C_0$ (ppm) | $C_f$ (ppm) | Removal (%) | $K_d$ (mL/g) |
|---|---|---|---|---|
| Pb$^{2+}$/Cd$^{2+}$ | Ag$^+$: 208 | 128 | 38.4 | 6.2 × 10$^2$ |
| (pH: 4.35→3.04) | Cu$^{2+}$: 489 | 455 | 6.9 | 7.4 |
|  | Pb$^{2+}$: 499 | 488 | 2.2 | 22.0 |
|  | Cd$^{2+}$: 243 | 225 | 7.4 | 8.0 |

V = 20 mL, m = 0.02 g, V/m = 20/0.02 = 1000.

TABLE 4

Removal of PPy(NO$_3$)$_x$ towards mixture of Au(III), Fe$^{3+}$, and Cu$^{2+}$.

| Mixed ions | $C_0$ (ppm) | $C_f$ (ppm) | Removal (%) | $K_d$ (mL/g) |
|---|---|---|---|---|
| Au(III)/Fe$^{3+}$/Cu$^{2+}$ | Au(III): 1.24 | <0.001 | >99.9 | >1.2 × 10$^6$ |
| (pH: 2.91→2.92) | Fe$^{3+}$: 85.8 | unchanged | / | / |
|  | Cu$^{2+}$: 107 | 107 | / | / |
| Au(III)/Fe$^{3+}$/Cu$^{2+}$ | Au(III): 0.12 | <0.001 | >99.1 | >1.2 × 10$^5$ |
| (pH: 2.35→ 2.21) | Fe$^{3+}$: 978 | 973 | / | / |
|  | Cu$^{2+}$: 1057 | unchanged | / | / |
| Au(III)/Fe$^{3+}$ | Au(III): 0.03 | <0.001 | >96.6 | >2.8 × 10$^4$ |
| (pH: 2.36→2.29) | Fe$^{3+}$: 949 | 948 | / | / |
| Au(III)/Cu$^{2+}$ | Au(III): 0.73 | <0.001 | >99.8 | >7.3 × 10$^5$ |
| (pH: 4.45→3.46) | Cu$^{2+}$: 970 | unchanged | / | / |

V = 20 mL, m = 0.02 g, V/m = 20/0.02 = 1000.

TABLE 5

Absorption data of PPy(NO$_3$)$_x$ towards individual ions.

| Ions | $C_0$ (ppm) | $C_f$ (ppm) | Removal (%) | $K_d$ (mL/g) |
|---|---|---|---|---|
| Cu$^{2+}$ [a] | 10.1 | 10.4 | / | / |
| Fe$^{3+}$ [b] | 9.51 | 6.13 | 35.5 | 5.5 × 10$^2$ |
| Ag$^+$ [c] | 7.9 | 4.16 | 47.3 | 9.0 × 10$^2$ |
| Ag$^+$ [d] | 206 | 141 | 31.5 | 4.6 × 10$^2$ |
| Hg$^{2+}$ [e] | 14.2 | 3.89 | 72.6 | 2.6 × 10$^3$ |
| Au(III) [f] | 9.05 | <0.001 | >99.99 | >9.0 × 10$^6$ | m = 0.02 g, V = 20 mL, V/m = 1000 mL/g; Contact time: 24 h.
pH values: [a]5.22→3.19, [b]3.45→3.12, [c]5.50→3.27, [d]5.22→3.02, [e]3.80→3.09, [f]3.54→3.01.

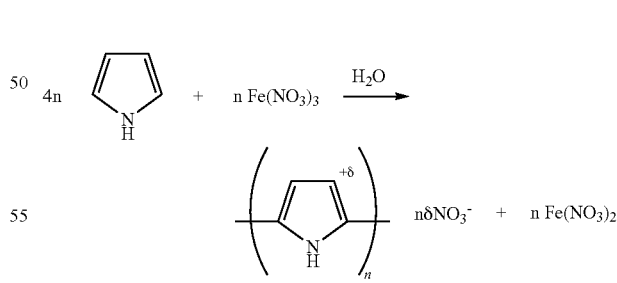

($\delta$ = 0.25, n = 4)

Scheme 1. Oxidative chemical polymerization reaction of NO$_3^-$ doped pyrrole.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A method of removing gold ions, silver ions, or both gold and silver ions from a sample comprising the gold ions, silver ions, or both gold and silver ions using an anion-doped conjugated polymer comprising:
   a conjugated, positively charged backbone of conjugated rings; and
   dopant anions associated with the conjugated, positively charged backbone, wherein the dopant anions comprise nitrate anions, acetate anions, or a combination of nitrate anions and acetate anions,
   the method comprising:
   combining the anion-doped conjugated polymer with the sample, wherein gold ions, silver ions, or both gold ions and silver ions are adsorbed by the anion-doped conjugated polymer and undergo electroless reduction to elemental gold, elemental silver, or both elemental gold and elemental silver; and
   removing the anion-doped conjugated polymer and the elemental gold, elemental silver, or both elemental gold and elemental silver from the sample.

2. The method of claim 1, wherein the dopant anions comprise nitrate anions.

3. The method of claim 2, wherein the sample is an aqueous solution having a pH of no greater than 6.

4. The method of claim 2, wherein the sample is an aqueous solution having a pH of no greater than 4.

5. The method of claim 4, wherein the sample is an aqueous solution having a pH in the range from 1 to 2.

6. The method of claim 5, wherein the conjugated polymer is a polypyrrole.

7. The method of claim 2, wherein the conjugated polymer is a polypyrrole.

8. The method of claim 2, wherein the conjugated polymer is a polyaniline.

9. The method of claim 2, wherein the conjugated polymer is a polythiophene.

10. The method of claim 1, wherein the sample comprises the gold ions and the gold ions are adsorbed by the anion-doped conjugated polymer and undergo electroless reduction to elemental gold.

11. The method of claim 10, wherein the sample further includes additional metal ions selected from $Hg^{2+}$ ions, $Cu^{2-}$ ions, $Fe^{3-}$ ions, $Pb^{2+}$ ions, $Cd^{2+}$ ions, or a combination of two or more thereof, and the anion-doped conjugated polymer has a selectivity for gold adsorption that is at least twice its selectivity for the adsorption of any of the additional metal ions.

12. The method of claim 10, wherein the dopant anions comprise the nitrate anions.

13. The method of claim 12, wherein the conjugated polymer is a polypyrrole.

14. The method of claim 1, wherein the sample comprises the silver ions and the silver ions are adsorbed by the anion-doped conjugated polymer and undergo electroless reduction to elemental silver.

15. The method of claim 14, wherein the dopant anions comprise the nitrate anions.

16. The method of claim 15, wherein the conjugated polymer is a polypyrrole.

17. The method of claim 1, wherein the conjugated polymer is a polypyrrole.

18. The method of claim 1, wherein the conjugated polymer is a polyaniline.

19. The method of claim 1, wherein the conjugated polymer is a polythiophene.

20. The method of claim 1, wherein the dopant anions comprise the acetate anions.

21. The method of claim 13, wherein the sample comprises the gold ions and the silver ions, the sample has a pH in the range from 2.5 to 4.5, and adsorption of the gold ions by the anion-doped conjugated polymer is favored over adsorption of the silver ions by the anion-doped conjugated polymer.

22. The method of claim 1, wherein the anion-doped conjugated polymer is in the form of: a membrane; particles; a coating on porous support particles; or beads, and combining the anion-doped conjugated polymer with the sample comprises: introducing the membrane, the particles, or the porous support particles coated with the anion-doped conjugated polymer, into the sample; or passing the sample over the particles, the porous support particles coated with the anion-doped conjugated polymer, or the beads in a column.

* * * * *